United States Patent [19]

Martin et al.

[11] Patent Number: 5,761,410
[45] Date of Patent: Jun. 2, 1998

[54] STORAGE MANAGEMENT MECHANISM THAT DETECTS WRITE FAILURES THAT OCCUR ON SECTOR BOUNDARIES

[75] Inventors: Dennis Roy Martin, Rochester; Michael James McDermott, Oronoco; Duc Nguyen, Plymouth, all of Minn.

[73] Assignee: International Business Machines Corporation, Armonk, N.Y.

[21] Appl. No.: 496,143

[22] Filed: Jun. 28, 1995

[51] Int. Cl.⁶ ................................................ G06F 11/10
[52] U.S. Cl. ........................... 395/183.18; 395/185.07
[58] Field of Search ..................... 395/183.18, 182.18, 395/185.06, 185.07, 182.03, 40.11, 40.12, 40.13, 40.14, 40.15, 40.16, 40.17, 40.18, 40.2, 40.3, 40.4

[56] References Cited

U.S. PATENT DOCUMENTS 5,412,801  5/1995  de Remer et al. ............... 395/182.18
5,544,312  8/1996  Hasbun et al. .................. 395/183.18

*Primary Examiner*—Robert W. Beausoliel, Jr.
*Assistant Examiner*—P. Vales
*Attorney, Agent, or Firm*—Steven W. Roth

[57] ABSTRACT

DASD failures occurring on sector boundaries currently go undetected. While this sort of problem can occur at any time, it usually occurs when the program executing on the computer system's processor is operating on a multisector piece of data and periodically updating that information in auxiliary storage so that the copy in auxiliary storage is relatively up to date with the changes being made by the program. The storage management mechanism of the present invention solves the problem of sector boundary write failures by associating a sequence number with each piece of multisector data. Essentially, the sequence number becomes a property of the particular piece of data itself. When the mechanism retrieves the information from disk, it checks to make sure that all the sequence numbers match. If they do not, a data integrity problem has been detected.

20 Claims, 5 Drawing Sheets

STORAGE MANAGEMENT MECHANISM THAT DETECTS WRITE FAILURES THAT OCCUR ON SECTOR BOUNDARIES

FIELD OF THE INVENTION

The present invention relates to data processing systems. More particularly, the present invention relates to the handling of write failures on mass storage devices.

BACKGROUND OF THE INVENTION

The development of the EDVAC computer system of 1948is often cited as the beginning of the computer era. Since that time, computer systems have evolved into extremely sophisticated devices. However, even today's most sophisticated computer systems continue to include many of the basic elements that were present in some of first computer systems. Two such elements are the computer system's processor and memory. A computer system's processor is the intelligent portion of the computer system. The processor is responsible for executing programs that interpret and manipulate information that is given to the computer system by the computer system's user or users.

As is well known, the information (called data) is stored in the computer system's memory. Computer system memory is generally categorized into two types. While there are various names used to characterize these two basic types of computer system memory, the terms used in this patent document will be "main memory" and "auxiliary storage". In general, main memory is used by the computer system to store information that is of current interest to the programs executing on the computer system's processor. Auxiliary storage, on the other hand, is used to store the information that is not currently needed by the programs. When a program needs to gain access to a particular piece of information, it will first check to see if that information is available in main memory. If the information is not in main memory, the computer system will move the needed information from auxiliary storage into main memory before the program begins operating on that information.

For the most part, this invention pertains to the auxiliary storage form of memory. Auxiliary storage devices, sometimes referred to as mass storage devices, generally have much greater storage capability than that of main memory. However, the time it takes to access the information is generally much longer than main memory. This is why computer systems move needed information from the larger/slower mass storage devices into the smaller/faster main memory before operating on the information. Mass storage devices are typically constructed using magnetic or optical media that store the information in binary form. Magnetic storage devices are often referred to as DASD devices, which is an acronym that stands for Direct Access Storage Device. DASD devices commonly include a number of disks that are made out of magnetic material. The surface of the magnetic disk is divided into tiny cells which are magnetically encoded to represent what is referred to as a bit of data. Each bit can be made to represent one of the two states of a binary digit (i.e., 1or 0).

To help determine where given information is located, disks are usually divided up into what are called tracks. These tracks are then further divided into what are called sectors. Disks with around 4000 tracks having in the neighborhood of 75 sectors per track are common in today's DASD devices. While sector sizes vary, sectors are commonly 512 bytes in size. One byte is made up of 8 bits of information.

When a program executing on the computer system's processor wants to store information on a DASD device, the computer system gives the device the information and tells the device where the information can be located (i.e., by telling the device which track and what sector should be used). However, most pieces of information are typically larger than a single sector (i.e., larger than 512 bytes for most of today's sectors). When storing one of these larger pieces of information, the computer system first divides the information into blocks that correspond in size to a single sector. The computer then sends the "sectorized" information to the DASD device and instructs the device as to which track and sectors should be used to store the information. Upon receipt of the sectorized information, the DASD device begins to store (called writing) the information on a sector by sector basis.

Overall, today's DASD devices are considered to be quite reliable; however, even the smallest amount of lost information can be catastrophic to the computer system's owner. Generally speaking, there are three error conditions that can result in lost information. First, a DASD device may be simply unable to write information into a particular sector because of a DASD device failure. If this occurs, the device will so notify the requesting program. Second, the DASD device may be in the midst of writing information into a particular sector when it is somehow interrupted. This sort of a failure can similarly occur because of a DASD device failure or because of an unexpected power outage. As before, today's devices have a built in mechanism that eventually alerts the computer system of the failure.

The third type of failure is one that occurs when the device is in between sectors while storing a multisector piece of information. In other words, the failure occurs after the DASD device has finished writing information into one sector, but before the device begins writing information into another sector. A failure of this sort is particularly problematic because state of the art technology does not detect this type of failure, which means that the failure goes unnoticed by the computer system's programs.

Without a mechanism that can call attention to this third type of failure condition, computer systems will continue to periodically lose information while attempting to store multisector pieces of information.

SUMMARY OF THE INVENTION

It is, therefore, a principal object of this invention to provide a computer system with an enhanced mechanism for handling multisector pieces of information.

It is another object of this invention to provide an enhanced storage management mechanism that alerts requesting programs of data integrity problems that stem from write failures that occur on a sector boundaries.

These and other objects of the present invention are accomplished by the enhanced storage management mechanism disclosed herein.

As described in the background section, DASD failures occurring on sector boundaries currently go undetected. While this sort of problem can occur at any time, it usually occurs when the program executing on the computer system's processor is operating on a multisector piece of data and periodically updating that information in auxiliary storage so that the copy in auxiliary storage is relatively up to date with the changes being made by the program. The storage management mechanism of the present invention solves the problem of sector boundary write failures by associating a sequence number with each piece of multisector data. Essentially, the sequence number becomes a property of the particular piece of data itself.

When a program wishes to store a multisector piece of data to auxiliary storage, the program invokes the multi-block server of the present invention. The multi-block server divides the piece of data into logical blocks. The size of each block is equal to that of the sectors on the computer system's mass storage device (512 byte sector sizes are common in today's mass storage devices). The multi-block server then increments the sequence number by 1 and stores the incremented sequence number into each of these logical blocks. Once this is accomplished, the multi-block server sends the data, sequence numbers and all, to the mass storage device. The mass storage device then proceeds to write the data to the designated sectors. Since the sequence number copies are incorporated into each of these sectorized pieces of data, they are also written to disk as a matter of course. If a failure occurs on a sector boundary, the data that was to be stored in the next sector will be lost, which means that the data that actually resides in that particular sector will be either out of date or completely unrecognizable to the requesting program. However, the copied sequence number that was part of the data will also have been lost.

When a program wants to retrieve data from auxiliary storage, the program will again invoke the multi-block server of the present invention. The multi-block server responds to the program by retrieving the information from the mass storage device. Upon receipt of all of the sectors that make up the multisector piece of data, the multi-block server checks to make sure that all of the sectors of data include the same sequence number copy. If the sectors all contain the same sequence number, all is well and the multi-block server simply passes the requested data back to the requesting program. However, if the sequence numbers do not match, the multi-block server reports this data integrity problem to the requesting program before passing the data to the program. The requesting program will then deal with the data integrity problem in the way its design dictates.

DETAILED DESCRIPTION

Figure 1:
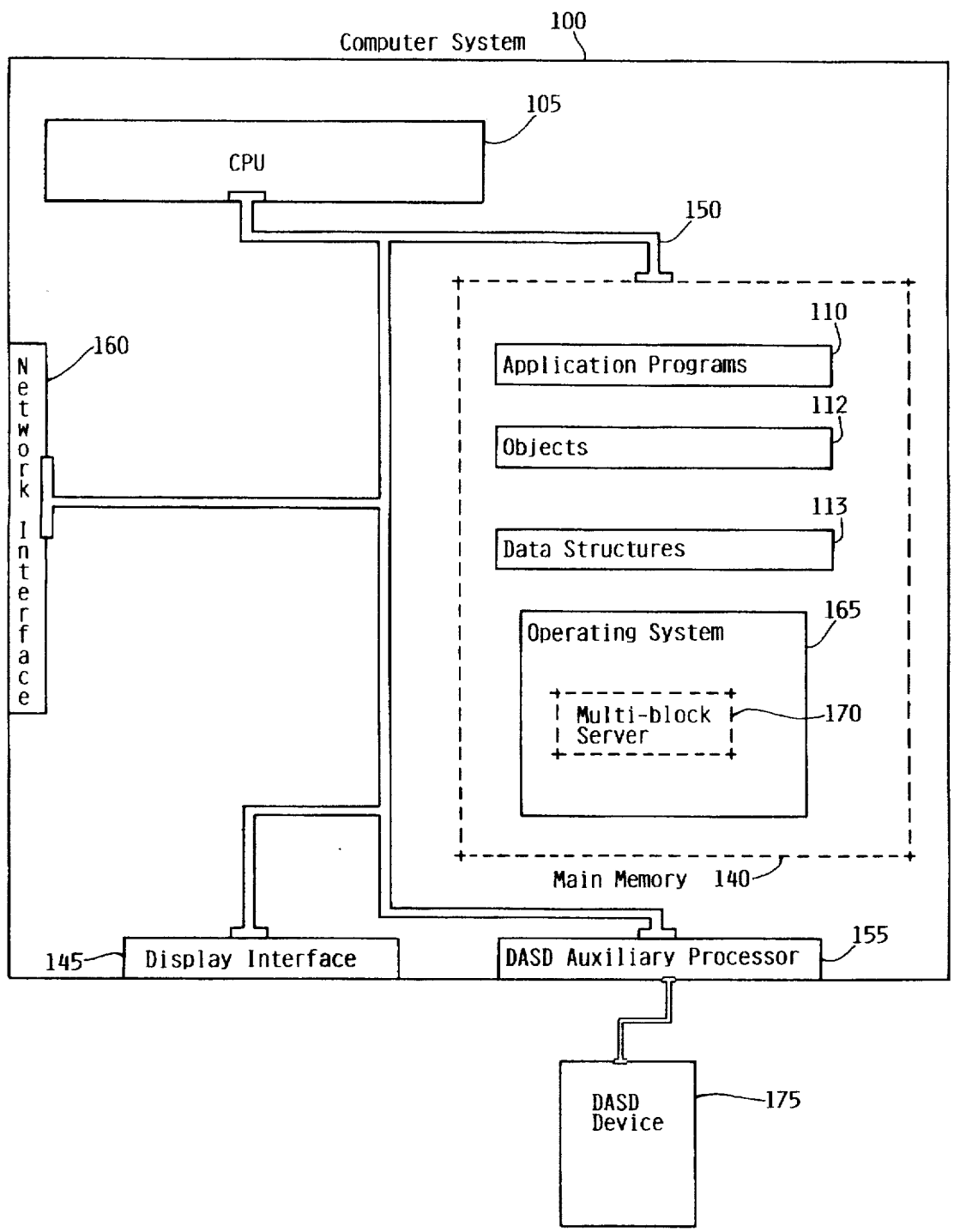
FIG. 1 is a block diagram of the computer system of the present invention.

FIG. 1 shows a block diagram of the computer system of the present invention. The computer system of the preferred embodiment is an enhanced IBM AS/400 mid-range computer system. However, those skilled in the art will appreciate that the mechanisms and apparatus of the present invention apply equally to any computer system that utilizes an auxiliary storage device, regardless of whether the computer system is a complicated multi-user computing apparatus or an imbedded computer system found in a personal electronic device.

As shown in the exploded view of FIG. 1, computer system 100 comprises main or central processing unit (CPU) 105, which is connected to data storage 140, terminal interface 145, network interface 160, and DASD auxiliary processor 155 via system bus 150. Terminal interface 145 allows system administrators and computer programmers to communicate with computer system 100, normally through programmable workstations. Network interface 160 is used by computer system 100 to communicate with other computer systems. DASD auxiliary processor 155, which is shown to be connected to DASD device 175, provides the interface between computer system 100 and DASD device 175. DASD device 175 is an IBM 6602, model 30 with 1 GB of storage capacity. However, those skilled in the art will appreciate that the present invention is not limited to any particular type of auxiliary storage device. Indeed, any storage device that involves logically segmented storage capacity could be used, regardless of whether that storage device is a present day magnetic or optical storage device or a futuristic storage device that retained the characteristic of logically segmented storage capacity.

Data storage 140 contains application programs 110, objects 112, data structures 113, and operating system 165. Operating system 165 is further shown to contain multi-block server 170 (referred to hereafter as MBS 170). While data storage 140 is shown as a monolithic entity, it should be understood that it may comprise a variety of devices, and that all programs and files shown will not necessarily be contained in any one device. For example, portions of application programs 110 and operating system 165 will typically be loaded into primary memory to execute, while other files may well be stored on magnetic or optical disk storage devices. Those skilled in the art will further appreciate that the present invention is capable of being distributed as a program product via floppy disk. CD ROM, or other form of recordable media or via any type of electronic transmission mechanism.

Figure 2A:
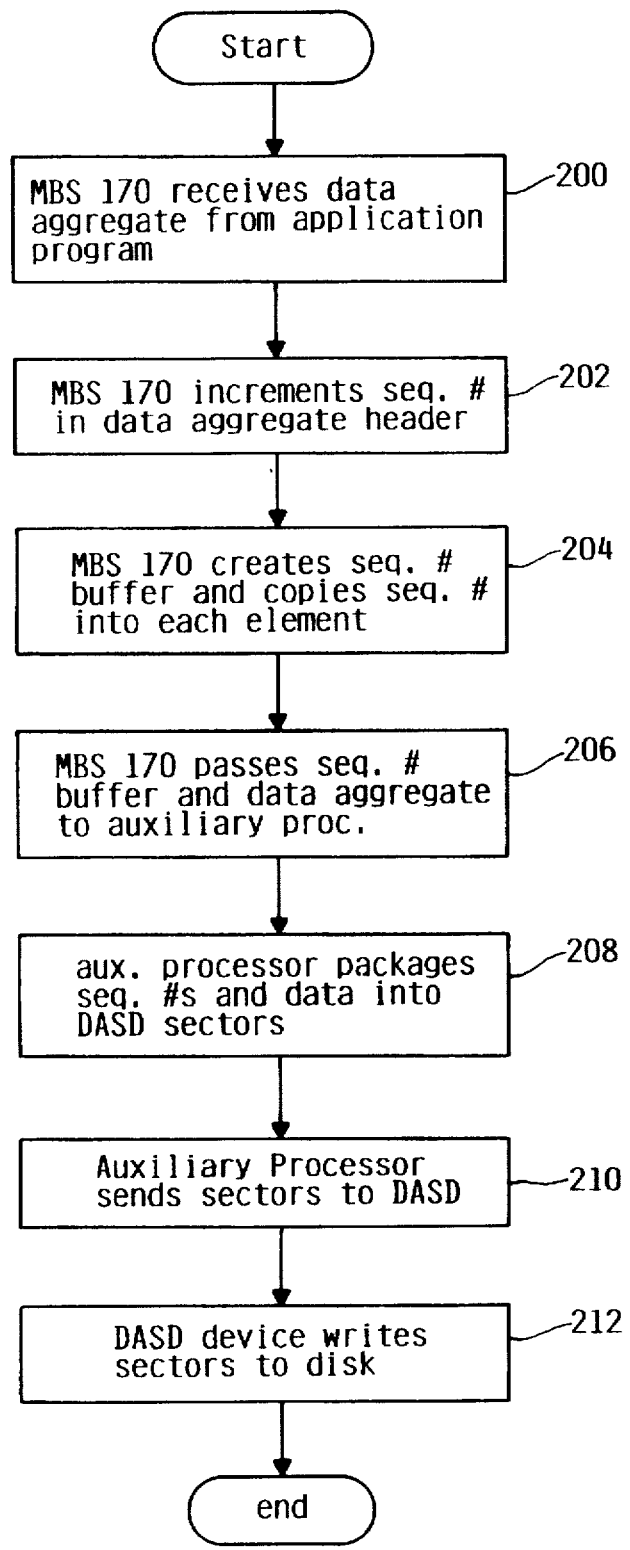
FIG. 2A is a flow diagram showing mechanisms designed to carry out steps of the preferred embodiment.

FIG. 2A is a flow diagram depicting the steps taken by MBS 170, auxiliary processor 155, and DASD device 175 to store a data aggregate on DASD device 175. In block 200, MBS 170 receives a data aggregate from one of application programs 110. The data aggregate is represented by a pointer to the data aggregate and a variable containing the data aggregate's size, although those skilled in the art will appreciate that any mechanism could have been used.

Figure 2B:
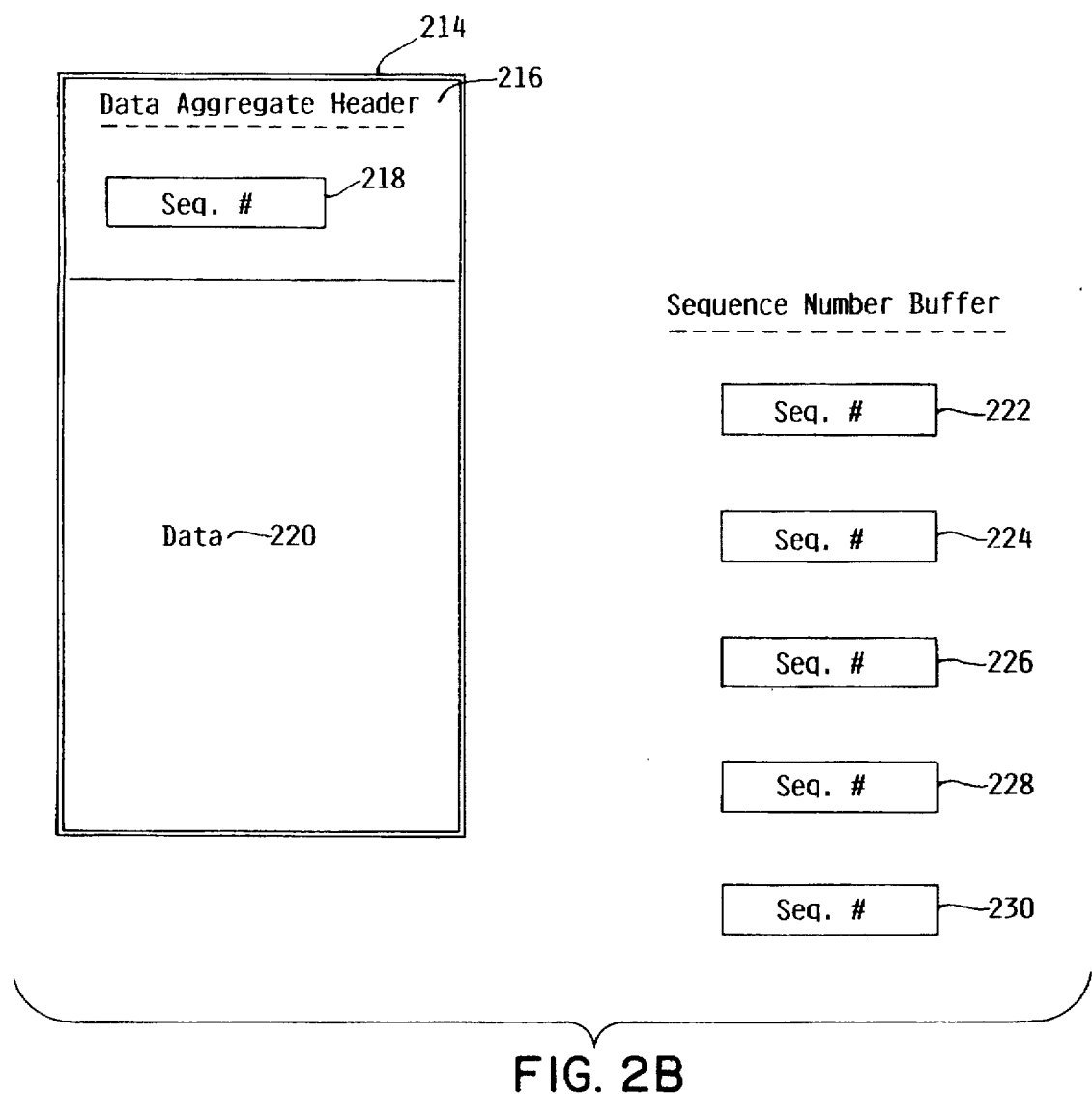
FIG. 2B is a block diagram showing a data aggregate, a sequence number, and a sequence number buffer, all constructed in accordance with the preferred embodiment of the present invention.

FIG. 2b is a block diagram that shows an example data aggregate. As shown, data aggregate 214 comprises data aggregate header 216, which itself includes sequence number 218, and data 220. The term data aggregate is used herein because the present invention is not limited to any particular type of data collection. Indeed, those skilled in the art will appreciate that the present invention applies equally to data files, data structures, objects or any other type of data aggregate that is larger in size than a single disk sector. (At this point it should be understood that the term "sector" is used extensively herein because the storage aggregate of DASD devices is called a sector. However, use of this term should not be construed to limit the invention to DASD sectors or even to DASD devices. The present invention is applicable to any present or future storage apparatus that includes logically segmented storage aggregates.)

In the preferred embodiment, sequence number 218 is 4 bytes in length, which means that it can be incremented up to 4 billion, 295 thousand; however, those skilled in the art will again appreciate that the present invention is not limited in scope to any particular sized sequence number. Data 220 is the actual data (i.e., the information that is to be stored in auxiliary storage).

After the data aggregate has been received from one of application programs 110, MBS 170 increments sequence number 218 [block 202 of FIG. 2A]. In block 204, MBS 170 creates a sequence number buffer and copies the incremented sequence number into each buffer entry. Also shown on FIG. 2B, is a logical view of a sequence number buffer that has been constructed in accordance with the preferred embodiment. The example sequence number buffer is shown to include entries 222, 224, 226, 228, and 230. Each entry contains a copy of data aggregate sequence number 218 (i.e., a sequence number copy). MBS 170 determines how many copies (i.e., entries) are needed by dividing the size of data 220 by a number equal to the sector size of DASD device 175 minus the 4 bytes needed for a sequence number copy. As mentioned, while any sector size could have been used, DASD device 175 of the preferred embodiment has a sector size of 512 bytes. Therefore, MBS 170 will divide the data aggregate by 508 bytes. For example, if data 220 was determined to be 2500 bytes in length, MBS 170 would first create a sequence number buffer having 5 entries and then copy data aggregate sequence number 218 into each entry.

Once MBS 170 has created a sequence number buffer with the correct number of entries, MBS 170 will pass data aggregate 214 and the sequence number buffer to DASD auxiliary processor 155 [block 206 of FIG. 2A]. While an auxiliary processor is used in the preferred embodiment, any mass storage device interface could have been used. Auxiliary processor 155 is suitably programmed to first divide data aggregate 214 into smaller data aggregates that are each the size of a single disk sector and then place a sequence number copy (from the sequence number buffer) into each of these smaller data aggregates [block 208]. Once auxiliary processor 155 has sectorized the data and packaged the sequence number copies into that data, auxiliary processor 155 will send the data to DASD device 175 [block 212]. DASD device 175 then writes the data to the specified sectors of one of its disks.

Figure 2C:
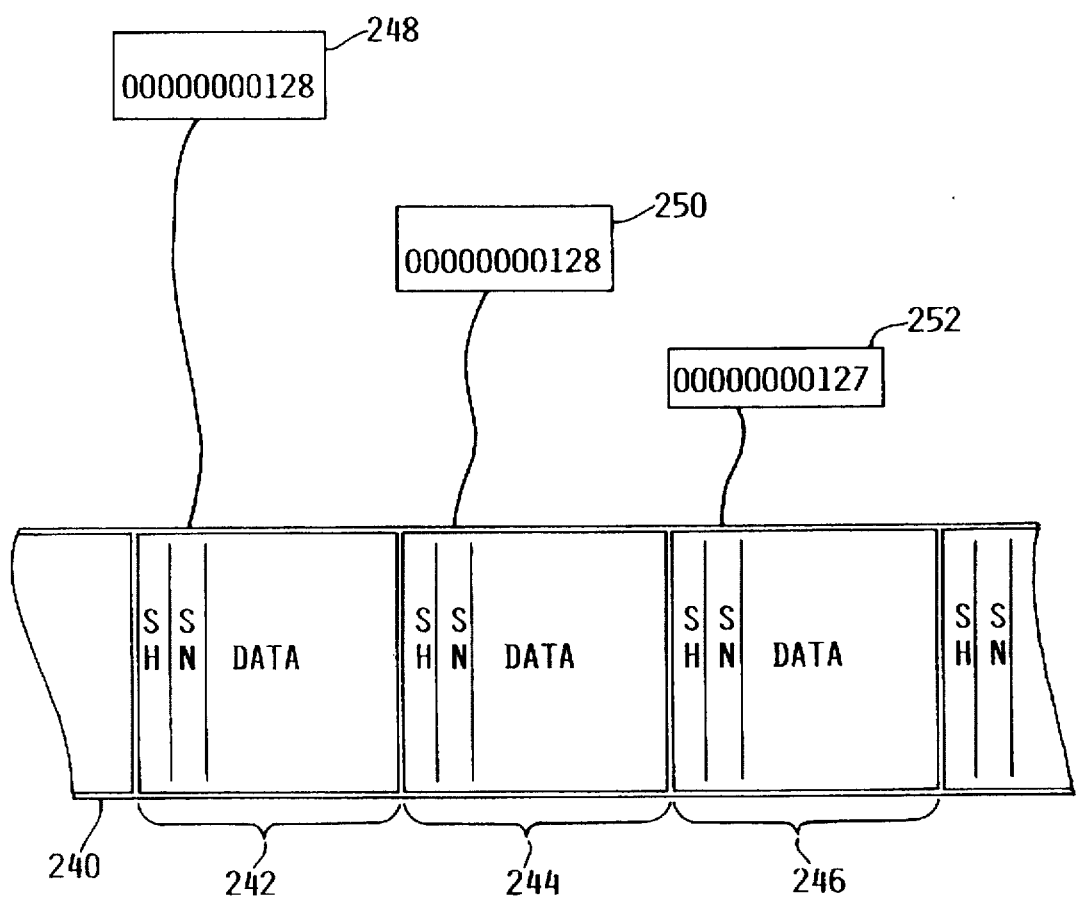
FIG. 2C is a block diagram that shows a partial disk image of a data aggregate that was constructed and stored in accordance with the preferred embodiment of the present invention.

FIG. 2C is a block diagram that shows a partial disk image of a data aggregate that was constructed in accordance with the preferred embodiment. Said another way, FIG. 2C shows how a sectorized data aggregate would look after it had been stored on DASD device 175. Disk image 240 is a small portion of a track on one of the magnetic disks of DASD device 175. The portions shown comprise disk sectors 242, 244, and 246. Each sector comprises a sector header (denoted as SH), a sequence number copy (denoted as SN), and data. The sector headers of the preferred embodiment, which are created by DASD device 175 itself, contain track and sector information so that DASD device 175 can read and write data from the individual sectors while understanding each sector'relative position. However, it should be understood that the present invention is not limited to any one sector header configuration. Indeed, those skilled in the art will appreciate that the benefits and advantages of the present invention are not in any way constrained by the particulars of sector header configuration and that the present invention applies equally to any configuration, even if the concept of a sector header is wholly absent from such a configuration.

Sequence number copies are used to house copies of the sequence number that is associated with each data aggregate. In FIG. 2C, the sequence numbers of the sectors have been exploded to show sequence numbers 248, 250, and 252. These sequence numbers are respectively shown to be 128, 128, and 127. The significance of these numbers will be explained in the text associated with FIG. 3.

Figure 3:
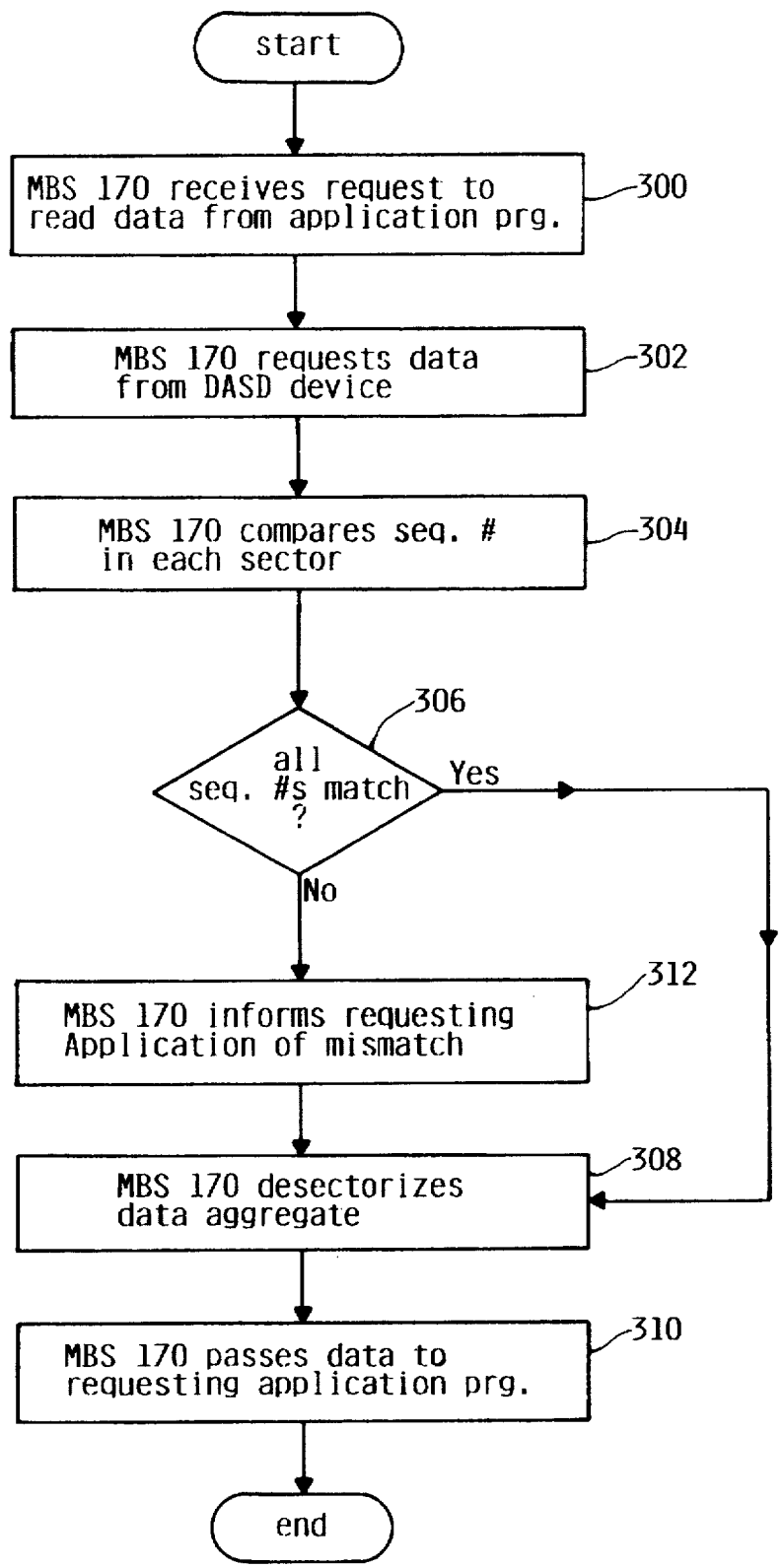
FIG. 3 is a flow diagram that shows mechanisms designed to carry out steps of the preferred embodiment of the present invention.

FIG. 3 is a flow diagram showing the steps taken by MBS 170 when retrieving data that was previously stored on DASD device 175. In block 300, MBS 170 receives a request from one of application programs 110. In the preferred embodiment, the request includes a data aggregate handle that can be used to identify the data aggregate to be retrieved; however, those skilled in the art will appreciate that there are any number of ways to identify a particular data aggregate on disk and that the present invention is not limited to any one mechanism. Upon receipt of the request, MBS 170 relays the request to DASD device 175 (i.e., via auxiliary processor 155) [block 304].

When MBS 170 receives the sectorized data aggregate back from DASD device 175, MBS will check the sequence number copies in each sector to determine whether they all match [block 304]. If all of the sequence number copies match, MBS 170 will "desectorize" the data aggregate (i.e., remove all of the sequence number copies and package the data aggregate back into a single data aggregate) [block 308] and pass the data aggregate to the requesting program [block 310]. If all of the sequence number copies do not match, MBS 170 will similarly "desectorize" the data aggregate [block 308] and pass the data aggregate to the requesting program [block 310]. However, before desectorizing the data aggregate and sending it to the requesting application program, MBS 170 will first inform the requesting program of the data integrity problem [block 312].

Please consider again the partial disk image shown on FIG. 2C. As previously mentioned, sequence number copies 248, 250, and 252 respectively contain sequence numbers 128, 128, and 127. Notice that sequence number copy 252 does not contain the same sequence number as the others. FIG. 2C has been drawn this way to show how an invalid disk sector would appear on disk. When DASD device 175 set out to store data aggregate 214 to disk, it was able to write sectors 242 and 244 successfully. However, DASD device 175 was interrupted (e.g., perhaps because of power failure) just after writing sector 244 and before starting to write sector 246. That is, DASD device 175 was interrupted on the sector boundary between sectors 244 and 246. (As an aside, it should be noted that while a linear, sector to sector, write scheme has been discussed for the purposes of explanation, that the present invention applies equally no matter the order in which sectors are actually written.)

When MBS 170 receives the sectorized data of data aggregate 214, it will detect this data integrity problem in block 304 of FIG. 3 and so notify the requesting application in block 312 of FIG. 3. It is then up to the requesting application to rebuild the data or otherwise recover in the manner it was designed.

While not shown, it should be noted that MBS 170 could be easily modified to accommodate the particularized needs of any one computer system. For example, MBS 170 could be designed to:

1) notify another computer system entity (e.g., a computer system error handler) of the failure and/or alternatively pass the data aggregate at issue to that other computer system entity for recovery;

2) simply inform the requesting application program of the error without passing the data aggregate to the requesting program;

3) notify the application program or other system entity of the sector or sectors that were found to have the data integrity problem; or 4) any desirable combination of the above.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A apparatus, said apparatus comprising:
   a bus;
   a processor;
   main memory, said main memory being connected to said processor via said bus;
   an auxiliary storage device, said auxiliary storage device having storage capability that is logically segmented into a plurality of storage aggregates;
   application programs, said application programs executing on said processor to operate on at least one data aggregate, said at least one data aggregate being larger than one of said plurality of storage aggregates; and
   a multiblock server, said multiblock server being capable of detecting auxiliary storage device failures that occur on boundaries of said plurality of storage aggregates.

2. The apparatus of claim 1 wherein said at least one data aggregate has a sequence number and sequence number copies associated therewith, said sequence number copies being further associated with each of said plurality of storage aggregates, said sequence number copies being used by said multiblock server to determine whether an auxiliary device failure occurred on at least one boundary of said plurality of storage aggregates.

3. The apparatus of claim 2 wherein said multiblock server determines whether said auxiliary device failure occurred on said at least one boundary of said plurality of storage aggregates by ascertaining whether all of said sequence number copies match.

4. A storage management mechanism, said storage management mechanism comprising:
   an auxiliary storage device, said auxiliary storage device having storage capacity that is logically segmented into a plurality of disk-oriented storage aggregates; and
   a multiblock server, said multiblock server being used to store data aggregates into a subset of said plurality of storage aggregates, said data aggregates each being larger than any one of said plurality of said storage aggregates, said data aggregates having a sequence number associated therewith, said multiblock server causing sequence number copies to be made, said sequence number copies being copied into each storage aggregate of said subset of said plurality of said storage aggregates.

5. The storage management mechanism of claim 4 wherein said multiblock server is used to read said data aggregates from said auxiliary storage device.

6. The storage management mechanism of claim 5 wherein said sequence number copies are used by said multiblock server to determine whether an auxiliary device failure occurred on at least one boundary of said plurality of storage aggregates.

7. The storage management mechanism of claim 6 wherein said multiblock server determines whether said auxiliary device failure occurred on said at least one boundary of said plurality of disk-oriented storage aggregates by ascertaining whether all of said sequence number copies match.

8. A program product, said program product comprising:
   a recordable media; and
   a multiblock server recorded on said recordable media, said multiblock server being used to store data aggregates onto an auxiliary storage device, said auxiliary storage device being logically segmented into a plurality of storage aggregates, each of said data aggregates being larger than any one of said plurality of said storage aggregates such that each of said data aggregates is stored in a subset of said plurality of storage aggregates, said data aggregates having a sequence number associated therewith, said multiblock server causing sequence number copies to be made, said sequence number copies being copied into each storage aggregate of said subset of said plurality of storage aggregates.

9. The program product of claim 8 wherein said multiblock server is used to read said data aggregates from said auxiliary storage device.

10. The program product of claim wherein said sequence number copies are used by said multiblock server to determine whether an auxiliary device failure occurred on at least one boundary of said plurality of storage aggregates.

11. The storage management mechanism of claim 10 wherein said multiblock server determines whether said auxiliary device failure occurred on said at least one boundary of said plurality of storage aggregates by ascertaining whether all of said sequence number copies match.

12. A method for distributing a program product, said method comprising the steps of:
    initiating a connection between a first computer system and a second computer system; and
    transmitting said program product from said first computer system to said second computer system, said program product being a multiblock server, said multiblock server being used to store data aggregates onto an auxiliary storage device, said auxiliary storage device being logically segmented into a plurality of storage aggregates, each of said data aggregates being larger than any one of said plurality of said storage aggregates such that each of said data aggregates is stored in a subset of said plurality of storage aggregates, said data aggregates having a sequence number associated therewith, said multiblock server causing sequence number copies to be made, said sequence number copies being copied into each storage aggregate of said subset of said plurality of storage aggregates.

13. The method of claim 12 wherein said multiblock server is used to read said data aggregates from said auxiliary storage device.

14. The method of claim 13 wherein said sequence number copies are used by said multiblock server to determine whether an auxiliary device failure occurred on at least one boundary of said plurality of disk-oriented storage aggregates.

15. The method of claim 14 wherein said multiblock server determines whether said auxiliary device failure occurred on said at least one boundary of said plurality of storage aggregates by ascertaining whether all of said sequence number copies match.

16. A method for managing multiblock data, said method comprising the steps of:
    determining that a data aggregate needs to be stored on an auxiliary storage device, said auxiliary storage device being logically divided into a plurality of storage aggregates, said data aggregate being larger than any one of said plurality of storage aggregates;

incrementing a sequence number, said sequence number being associated with said data aggregate;

associating said data aggregate with a subset of said plurality of said storage aggregates;

writing portions of said data aggregate into each storage aggregate of said subset of storage aggregates; and creating sequence number copies by copying said sequence number into each storage aggregate of said subset of storage aggregates.

17. The method of claim 16 further comprising the steps of:

retrieving said data aggregate from said auxiliary storage device;

comparing said sequence number copies to one another to determine whether said sequence number copies match; and notifying another computer system entity when said sequence number copies do not match.

18. The method of claim 17 further comprising the step of passing said data aggregate to an application program.

19. The method of claim 17 further comprising the step of passing said data aggregate to said other computer system entity.

20. The method of claim 17 further comprising the steps of:

notifying a requesting application program when said sequence number copies do not match; and passing said data aggregate to said application program.

\* \* \* \* \*

UNITED STATES PATENT AND TRADEMARK OFFICE
CERTIFICATE OF CORRECTION

PATENT NO. : 5,761,410

DATED : June 02, 1998

INVENTOR(S) : Dennis Roy Martin et al

It is certified that error appears in the above-identified patent and that said Letters Patent is hereby corrected as shown below:

Claim 10, Col. 8, Line 23, after claim, insert --9--.

Signed and Sealed this

Twenty-ninth Day of September, 1998

Attest:

BRUCE LEHMAN

*Attesting Officer*  *Commissioner of Patents and Trademarks*